July 24, 1928.
H. S. FRANK
1,678,248
PISTON RING
Filed Jan. 15, 1925
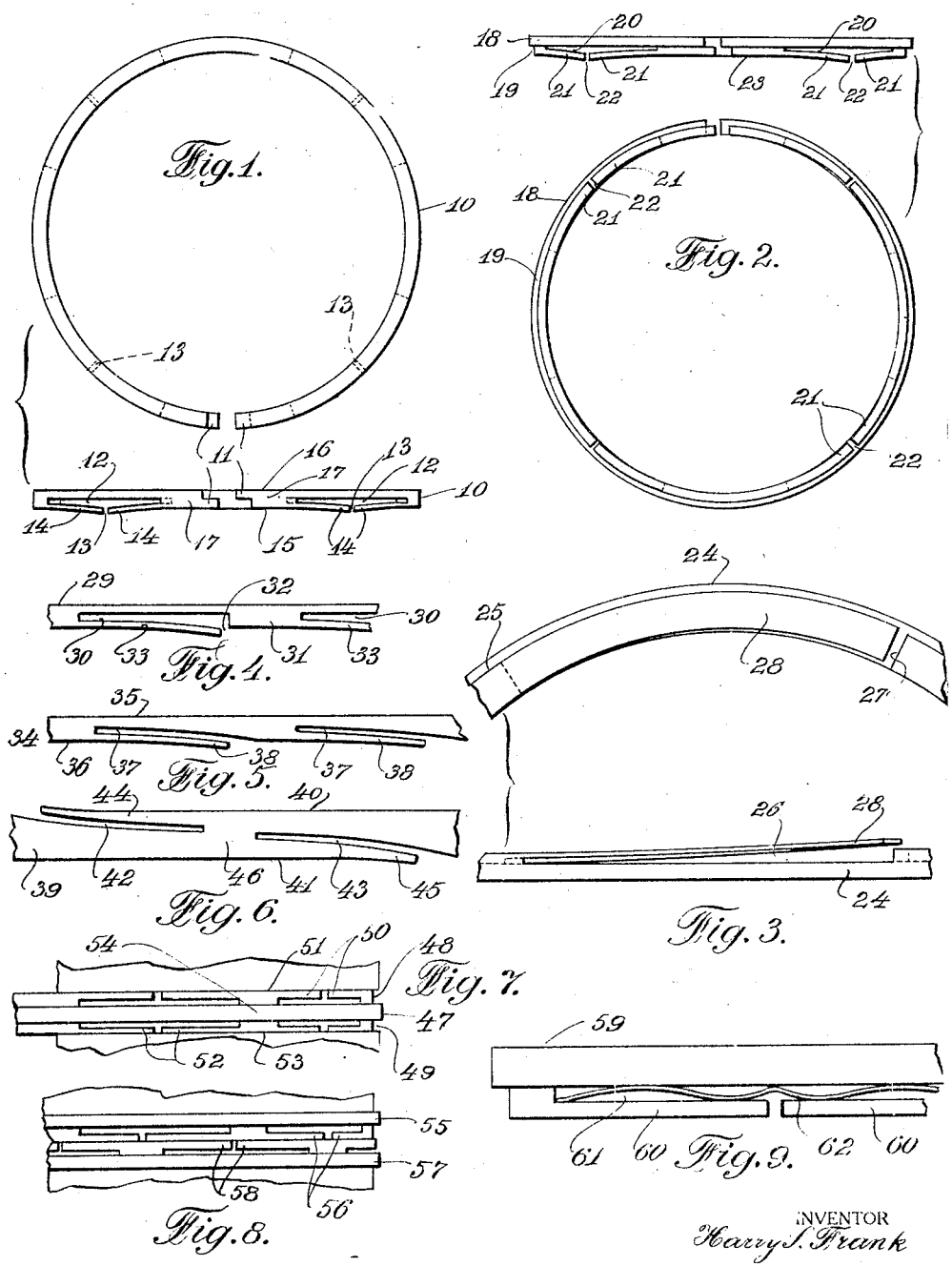

Patented July 24, 1928.

1,678,248

UNITED STATES PATENT OFFICE.

HARRY S. FRANK, OF BROOKLYN, NEW YORK.

PISTON RING.

Application filed January 15, 1925. Serial No. 2,480.

This invention relates to piston rings.

One of the objects of my invention is the method or process of producing piston rings which will expand laterally within the piston ring groove.

Another object of my invention is to provide a ring accomplishing the results sought by the method.

It is a well known fact that when a piston ring does not properly fit the piston ring groove the constant hammering motion by the piston ring against the piston groove walls will gradually result in widening the groove and wearing down not only of the piston ring itself, but also of the piston, thereby causing an excess of lubricant to penetrate above the piston.

This results in excessive carbon deposits in the combustion chamber and deficiency in the engine operation, not to speak of the clogging of the spark plugs.

To overcome the so-called flop of the rings within the piston grooves, many attempts have been made to so construct the ring as to reduce its motion within the grooves. In a great many cases the ring was made of a plurality of parts including spring members, wedges, and other means designed to assure the proper fit of the ring within its groove while reciprocating with the piston. There also have been provided various kinds of so-called oil retaining grooves in the ring designed to receive excessive oil and drain it below the piston. All these attempts however, seem to have been futile as they affected the trueness of the ring. In other words the attempt of preventing the oil from reaching above the piston, resulted in the deformation of the ring body causing more undesirable effects instead of preventing them.

The present method and device is designed to effectively eliminate the "flop" of the ring within the piston groove without in any way affecting the true shape of the ring, and its consequent effective performance within the engine.

Generally speaking, the present method comprises the formation of a ring provided with laterally expanding resilient ring extensions, which tend to exert a constant uniform pressure against the walls of the grooves within the piston, adapted to receive the piston rings, whereby the latter is prevented from so-called "flopping" within its groove.

The foregoing and further objects of my invention will be more fully apparent from the following description and the accompanying drawings forming part of this disclosure and in which:

Figure 1 represents one form of my ring in plan view and elevation.

Figure 2 is another, modified form of my ring showing an elevation and bottom view thereof.

Figure 3 is an enlarged detailed view of a modified form of a ring.

Figures 4, 5, 6, 7, 8, and 9 are partial detail views of modified forms of my ring.

Referring to Figure 1 of the drawing a ring body 10 is shown which has overlapping ends 11 adapted to interengage each other when the ring is in operation.

At several places indicated at 12, the ring is slotted circumferentially and at the points 13, radial cuts are provided which cause a separation of the lower facial portions of the ring separated by slots 12. Thus a plurality of resilient extensions 14 are formed which are adapted to project below the lower face 15 of the ring.

When now the faces of the ring are subjected to the finishing operation which usually comprises the grinding and polishing of the faces, the upper face 16 will be uniformly finished, while the finishing operation of the lower face 15 will be somewhat different.

The fork-like prongs or projections 14 will, when the grindstone is pressed over the lower ring face be depressed to a certain extent into the slot 12, while the solid portions 17 retained between each groove of prongs 14, will be uniformly finished. Particularly the ends nearest to slots 13 will be least subjected to the finishing operation.

In order to maintain the resilient quality of prongs 14, I preferably subject the ring after the slotting operation to a heat treatment adapted to change the molecular arrangement of the ring material.

The process of manufacture of this ring may be described as follows:

First a ring blank is roughly machined, then slotted, whereafter it is compressed to assume a natural ring-like shape and in this shape the ring is again machined at its inner and outer surfaces and at its faces. Now the ring is slotted peripherally and then the radial cuts 13 are provided. The ribs or prongs 14 will now be flush with the solid portion of the ring. In order to make the prongs protrude beyond the solid portions of the slotted ring surface, two methods may be employed. The slotted ring surface may be ground. In this case the solid portions of the ring will be evenly affected by the grindstone, while the prongs will be somewhat depressed into slots 12, and according to their lengths will be more or less subjected to the grinding operation, the result being that they will extend beyond the face of the solid portions of the ring after the grinding operation.

The second way of bringing out the prongs beyond the surface is to insert into slots 12 spreaders. While the prongs of the ring project beyond the face of the ring and are maintained in this position the ring is subjected to a high temperature, then the ring is permitted to slowly cool, while the prongs are still in their position projecting beyond the face of the ring. When the ring is cold the prongs are permanently set. Now the ring may be refinished if desired.

The prongs 14 now become very resilient and sufficiently tough to prevent their breaking, while the rings are in operation.

Referring to Figures 2 and 3 it will be observed that the ring body 18 is reduced at 19, and that the slots 20 are provided in the reduced body portion of the ring, whereby prongs 21 separated by radial slots 22 are offset relative to the ring body.

The reason for reducing the ring body and providing the prongs in the reduced portion thereof, may be explained as follows:

The prongs 21 not only project below the lower face 23 of the ring as seen in the upper part of Figure 2, but they also expand radially towards the outer surface of the ring as may be readily seen in the lower part of Figure 2.

Thus when no provision would be made for accommodating the radially or peripherally projecting ends of the prongs, these ends would press against the cylinder wall and damage it by scorching it. These prongs may also break off during operation. For these reasons it is preferable to offset the ring portion from which the prongs are formed. In rings of small diameter where it would be impracticable to provide long peripheral slots thereby gaining long resilient prongs, the double prong arrangement shown in Figures 1 and 2 is abandoned and an arrangement shown in Figures 3 and 4 may be substituted.

Referring to Figure 3 there will be seen a ring body 24 which is reduced at 25, similar to the form described in Figure 2. The peripheral slots 26 are made in the reduced ring portion and radial slots 27 are provided at one end of slots 26. In this manner long single resilient prongs 28 are produced which have the tendency of projecting beyond the surface of the ring.

An arrangement similar to that shown in Figure 3 is illustrated in Figure 4 where however, reduction of the ring body is omitted. The ring body 29 is provided with a plurality of peripheral slots 30 between which a solid portion 31 is retained. Radial slots 32 at the end of slots 30 separate the ring material to form prongs 33.

The way of producing the laterally expanding prongs may be simplified by making oblique cuts from one surface of the ring towards the other surface of the ring as shown for instance in Figure 5 where the ring body 34, having faces 35 and 36, is provided with oblique slots 37 directed from face 36 towards face 35 thereby producing prongs 38. Slots 37 may be made either in straight line or on a curve.

Another representative form is shown in Figure 6 where a ring body 39, having faces 40 and 41, is provided with oblique curved slots 42 and 43 which are respectively directed from the surfaces 40 and 41 into the ring material.

In this way resilient prongs 44 and 45 at each face of the ring are provided. Also in this case a solid ring portion 46 of the original width of the ring is retained.

A more complicated form of my ring is shown in Figure 7 applicable for use with wider piston ring grooves. In this case a ring body 47 is illustrated which is reduced at both ends 48 and 49 at which reduced ends the prongs are formed in a similar manner as explained above.

The upper prongs 50 bear against the upper groove wall 51, while the lower prongs 52 bear against the lower groove wall 53. The original width or thickness of the ring is indicated at 54 and serves as spacer within the grooves and prevents twisting of the ring which may be caused by excessive compression. For very wide piston ring grooves a combination of two or more piston rings of my design may be employed as for instance shown in Figure 8 where an upper piston ring 55 with its prongs 56 is so arranged that its pronged face bears against the pronged face of a lower ring 57 provided with prongs 58.

Thus the prongs of two rings bear against each other and press the unslotted ring faces against the piston ring groove.

In order to enhance the expansion qualities of the prongs in lateral direction there might be special springs provided which are made insertable into the ring slots.

In Figure 9 there is shown a modified form of a ring indicated at 59 provided with prongs 60 and separated from the ring body by slot 61, in which is forced a spring 62 bearing against the upper surface of the slot and against the inner prong surface, thereby increasing the tendency of the prongs to expand laterally.

While I have shown and described in the present application specific forms of my ring, and while I have mentioned a specific form of the process of making the ring, be it understood that changes and improvements may be made within the scope of my invention for which I claim:—

1. A laterally expanding piston ring comprising a ring body having facial prong-shaped resilient extensions expanding axially and radially outwards.

2. A laterally expanding piston ring, comprising a ring body reduced at least at one end and having facially projecting resilient extensions forming integral parts of the reduced portion of the ring body.

3. A laterally expanding piston ring, comprising a ring body, reduced at least at one end and having prong-like portions forming integral parts of the reduced ring body and adapted to extend both laterally and peripherally.

Signed at New York in the county of New York and State of New York this 6th day of January, A. D. 1925.

HARRY S. FRANK.